United States Patent [19]
Rubright

[11] 3,993,283
[45] Nov. 23, 1976

[54] MOLDING APPARATUS FOR MOLDING A PIVOTABLE PLASTIC FLOW CONTROL DEVICE

[76] Inventor: Phillip L. Rubright, Berkley, Mich.

[22] Filed: Aug. 25, 1975

[21] Appl. No.: 607,854

Related U.S. Application Data

[62] Division of Ser. No. 287,293, Sept. 8, 1972, Pat. No. 3,901,964.

[52] U.S. Cl. .................................... 249/96; 249/95
[51] Int. Cl.² ........................................... B29C 6/00
[58] Field of Search ........................... 249/88–90, 249/94, 96, 57, 150, 91, 92, 93, 95, 97, 83; 425/500–502, 517, 110, 111, 127, 129 R, DIG. 43, 468

[56] References Cited
UNITED STATES PATENTS

| | | | |
|---|---|---|---|
| 2,197,465 | 4/1940 | Brunetti | 425/111 |
| 2,307,874 | 1/1943 | Bilde | 425/127 |
| 2,382,200 | 8/1945 | Brunner | 425/129 X |
| 2,386,034 | 10/1945 | Church | 425/502 |
| 2,445,405 | 7/1948 | Norris | 249/95 |
| 2,454,193 | 11/1948 | Martin | 249/94 X |
| 2,582,022 | 1/1952 | Feldman et al. | 249/95 |
| 2,850,892 | 9/1958 | Stump | 249/96 X |
| 3,109,201 | 11/1963 | Dulmage | 249/94 |
| 3,165,789 | 1/1965 | Jackson | 425/DIG. 43 |
| 3,199,829 | 8/1965 | Calim | 249/94 |
| 3,498,363 | 3/1970 | Spindler | 249/88 |
| 3,666,852 | 5/1972 | Burke | 425/517 |
| 3,675,888 | 7/1972 | Scaramucci | 249/95 |
| 3,773,454 | 11/1973 | Horve et al. | 425/129 R X |
| 3,907,624 | 9/1975 | Gravely, Jr. | 264/259 |
| 3,933,334 | 1/1976 | Edwards | 249/88 |

FOREIGN PATENTS OR APPLICATIONS

| | | | |
|---|---|---|---|
| 1,073,150 | 6/1967 | United Kingdom | 249/89 |

*Primary Examiner*—J. Howard Flint, Jr.
*Attorney, Agent, or Firm*—Reising, Ethington, Barnard, Perry & Brooks

[57] ABSTRACT

Open face molding apparatus for molding a pivotable flow control device. The flow control device has a main body portion of rigid plastic material and a sealing portion of elastomeric material on the outer periphery of the main body portion. The pivot rod of the flow control device has a central portion embedded in the rigid main body portion, with offset end portions, one of which has a crank arm formed thereon. The molding apparatus has a mold body with an open mold cavity having first and second portions for respectively forming portions of the main body portion and elastomeric sealing portion of the flow control device. A rim projects upwardly from opposite sides of the cavity, and a pair of pivot rod supporting grooves are formed in the rim on opposite sides of the cavity for supporting the offset end portions of the pivot rod above the cavity in such a manner that the central portion of the pivot rod is received only in the low portion of the cavity that forms the rigid main body portion of the flow control device. A projection extends outwardly from the mold body, and the projection is formed with a rod receiving recess and crank arm supporting slots for axially and angularly locating the pivot rod by merely placing the pivot rod in position on the rod receiving grooves and crank arm locating slots.

4 Claims, 8 Drawing Figures

MOLDING APPARATUS FOR MOLDING A PIVOTABLE PLASTIC FLOW CONTROL DEVICE

This is a division of application Ser. No. 287,293, filed Sept. 8, 1972, now U.S. Pat. No. 3,901,964.

This invention relates generally to flow control devices such as valves, dampers and the like for controlling flow through a duct or other flow passage, and is particularly concerned with a flow control device suitable for use in air conditioning, heating and ventilation systems of automobiles, and to a method and apparatus for manufacturing such flow control devices.

Flow control devices in the form of dampers or butterfly-type valves are particularly suitable for controlling the flow through automobile ventilation, air conditioning and heating ducts due to the ease and speed with which such devices can be manipulated. One of the problems with such devices is that of obtaining a good seal when the flow control device is in a closed position to shut off flow through a particular duct. This problem is of course magnified when the ducts and flow control devices must be produced on a mass production basis so that economical tolerances can be maintained for both the ducts and the flow control devices commensurate with the requirements for interchangability of the parts. For large quantity production, it is of course also necessary to maintain production and material costs at a minimum.

A flow control device of this type must have a relatively rigid body portion to which mounting means such as a pivot rod or the like can be secured, and must have a peripheral resilient sealing portion for engagement with the inner walls of the duct being controlled by the flow control device. The conventional flow control device of this type includes a metal body with a resilient sealing member somehow attached to the periphery of the metal body, the metal body having a pivot rod or some other type of mounting means secured thereto for pivotally mounting the device in a duct or conduit. Such devices are expensive to manufacture since the metal parts must first be formed, cast, machined or the like, and then must have a resilient sealing member attached thereto.

Examples of prior art flow control devices of this type including some prior art methods of fabrication and manufacturing the same, are disclosed in U.S. Pat. Nos. 2,772,850; 2,983,478; 3,050,781; 3,111,300; 3,193,914; 3,272,904; and 3,447,222.

An object of this invention is to provide a flow control device for controlling fluid flow through a duct wherein the flow control device can be completely fabricated in a single mold.

A further object is to provide a flow control device having a relatively rigid main body portion of plastic such as a thermosetting resin, and a sealing portion of elastomeric material on the periphery of the main body portion.

A further object is to provide a flow control device having a relatively rigid main body portion of thermosetting resin, a sealing portion of elastomeric material, and a mounting rod embedded in the main body portion for pivotally supporting the device in a duct wherein all three components of the device can be molded and assembled together in a single mold.

A further object is to provide a method and apparatus for making, on a mass production basis, a flow control device having a relatively rigid main body portion with a resilient sealing portion and a mounting rod or the like embedded in the main body portion.

In carrying out the foregoing, and other objects, a flow control device according to the invention may include a main body portion of thermosetting epoxy resin to which is molded on the periphery thereof a sealing portion of elastomeric material. The sealing portion may be of vinyl plastisol.

The main body portion may have embedded therein a mounting rod for pivotally supporting the device in a duct. A central portion of the rod is embedded in the main body portion, and offset end portions on the rod both project from the same side of the device so that the pivotal mounting may be located on the downstream side of the device whereby in an automobile ventilation system, the pivotal mounting will be on the passenger compartment side of the device, or the side of the device where it is not critical to prevent leakage from the duct.

The flow control device may be molded in a molding apparatus having a first mold portion with a bottom surface for defining one side surface of the elastomeric sealing portion and an edge surface for defining the outer periphery of the sealing portion with a second mold portion surrounded by the first mold portion and having a bottom surface for defining one side surface of the main body portion. A removable mold member receivable in the second mold portion is formed with an edge surface to define the inner periphery of the sealing portion.

The removable mold member is heated to a temperature at or above the temperature to gel plastisol, and is then placed in the molding apparatus. Vinyl plastisol or the like in liquid state is then poured into the first mold portion which surrounds the hot mold member. The hot mold member causes the plastisol to gel on contact, and thus prevents the liquid plastisol from leaking around the removable mold member from the first mold portion to the second mold portion. The liquid plastisol is then partially cured to the extent that the vinyl plastisol becomes non-liquid throughout. The removable mold member is then removed from the assembly and liquid thermosetting epoxy resin is then poured into the second mold portion which is surrounded by the partially cured elastomer. A mounting rod is then placed on the mold with the central portion thereof immersed in the liquid epoxy resin. The mold and the entire contents are then placed in a curing oven or the like to simultaneously cure the epoxy resin and complete curing of the plastisol. The plastisol is thus bonded to the epoxy resin, and the mounting rod is embedded in the solidified epoxy resin.

Other objects, advantages and features of the invention will become apparent from the following description taken in connection with the accompanying drawings in which.

Figure 1:
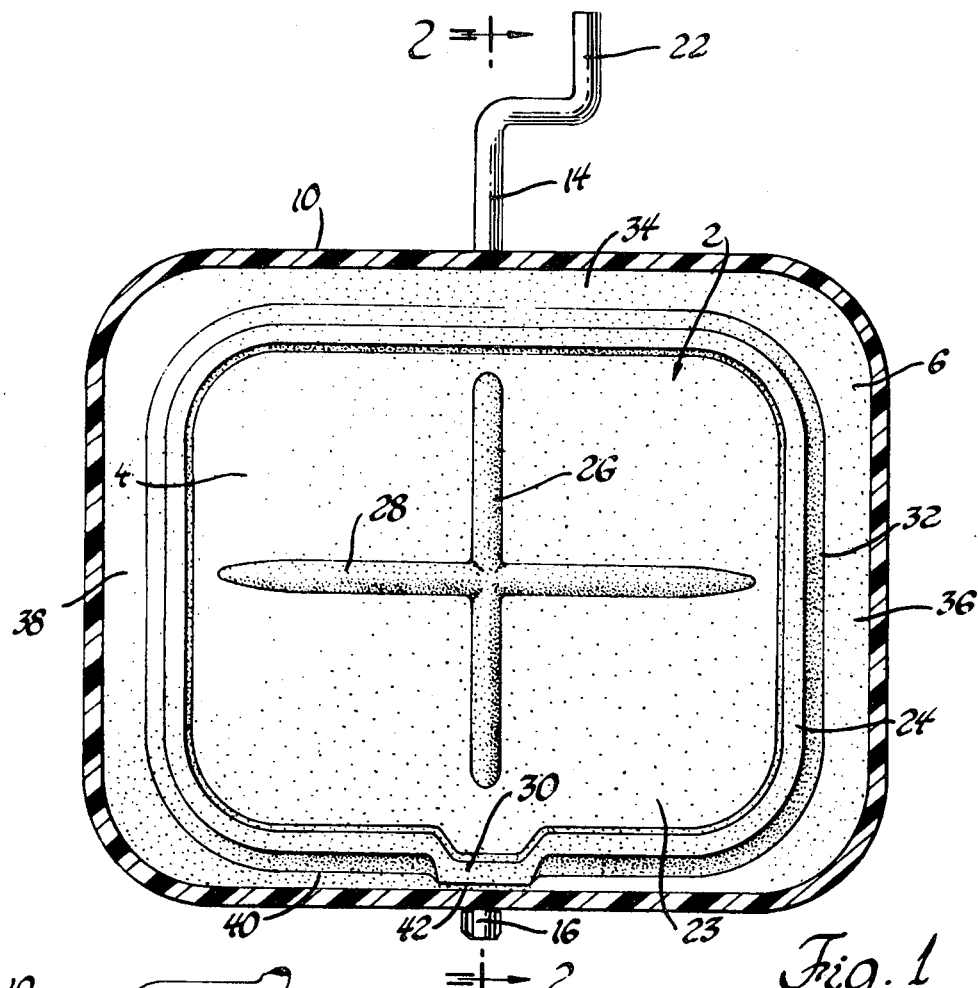
FIG. 1 is a cross-sectional veiw of a duct having a flow control device according to the invention mounted therein.
Figure 2:
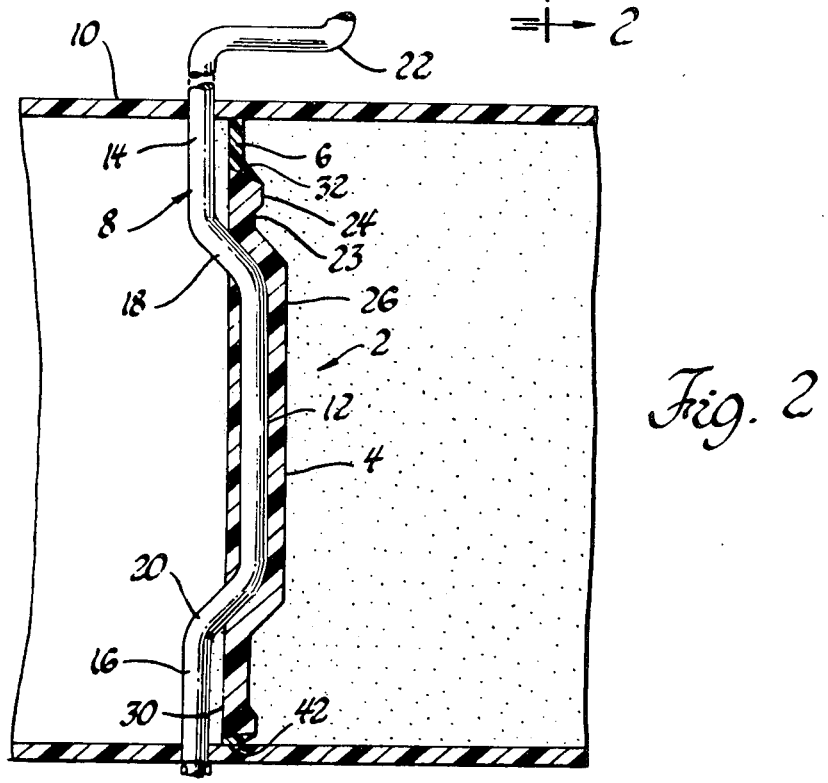
FIG. 2 is a sectional view taken on line 2—2 of FIG. 1.

With reference first to FIGS. 1 and 2, reference numeral 2 collectively designates a flow control device according to the invention having a main body portion 4 of rigid plastic material, and a sealing portion 6 of elastomeric material on the periphery of the main body portion 4. Mounting means 8 for pivotally mounting the flow control device 2 in a duct 10 comprises a rod molded to the main body portion 4.

The rod 8 has a central portion 12 embedded in the material of the body portion 4, and offset end portions 14 and 16 on the central portion both of which project from one side of the main body portion 4 and through openings in the wall of the duct 10 for pivotally mounting the flow control device 2 in the duct. The central portion 12 has outwardly bent portions 18 and 20 projecting from the main body portion 4, the end portions 14 and 16 extending respectively from the bent portions 18 and 20. A crank arm 22 is formed on the end portion 14 for connection with a cable or similar operating means.

The main body portion 4 of the control device 2 comprises a flat disc with a peripheral flange 24 projecting from one side thereof in the direction of the axis of duct 10. A central bead 26 projects from the same side 23 of the disc forming the main body 4, and the central portion 12 of the mounting rod 8 extends in parallel relationship with the bead 26. A bead 28 extending transversely of the bead 26 is also formed on the main body 4 and projects from side 23 thereof. A locating projection 30 is formed on the periphery of the disc or main body 4 for providing vertical support of the main body 4 in the duct 10. As illustrated by reference numeral 32, the edge surface of the disc or main body 4 is inclined outwardly and toward the left as viewed in FIG. 2, and the elastomeric sealing portion 6 is secured to the edge surface 32.

In the embodiment illustrated in FIGS. 1 and 2, the flow control device 2 is of non-circular configuration in plan, and the peripheral sealing portion 6 varies in width around the circumference of the main body 4. The top segment 34 and side segments 36 and 38 of the elastomeric sealing portion 6 are of substantially the same width, while the bottom segment 40 is of substantially less width than segments 34, 36 and 38. The segment 42 of the elastomeric portion adjacent the locating projection 30 is of substantially less width than segment 40. Vertical or axial support of the control device 2 is provided by the locating projection 30 so that the entire periphery of the sealing portion 6 is in good sealing engagement with the inner walls of the duct 10.

The openings in the duct 10 for the end portions 14 and 16 of the mounting rod 8 are on the downstream side of the control device 2 so that there is no likelihood of leakage through such openings on the upstream or high pressure side of the control device 2. The high pressure side is the right hand side of control device 2 in FIG. 2 of the drawings. The end portions 14 and 16 will generally be located on the passenger compartment side of the control device 2 where it is not critical to prevent leakage from the duct 10.

The thin portion 42 of the sealing portion 6 provides a seal beneath the locating projection 30 without a significant amount of deflection of the elastomeric portion 32 so that the upper segment 34 of the sealing portion 6 is in good sealing contact with the upper wall of the duct 10. The mounting rod 8 provides transverse support for the control device 2 such that the side segments 36 and 38 of the sealing portion 6 are in close sealing contact with the respective side walls of the duct. Consequently, when the control device 2 is in the fully closed position illustrated in FIGS. 1 and 2, there will be no flow through the duct past the control device 2.

Figure 3:
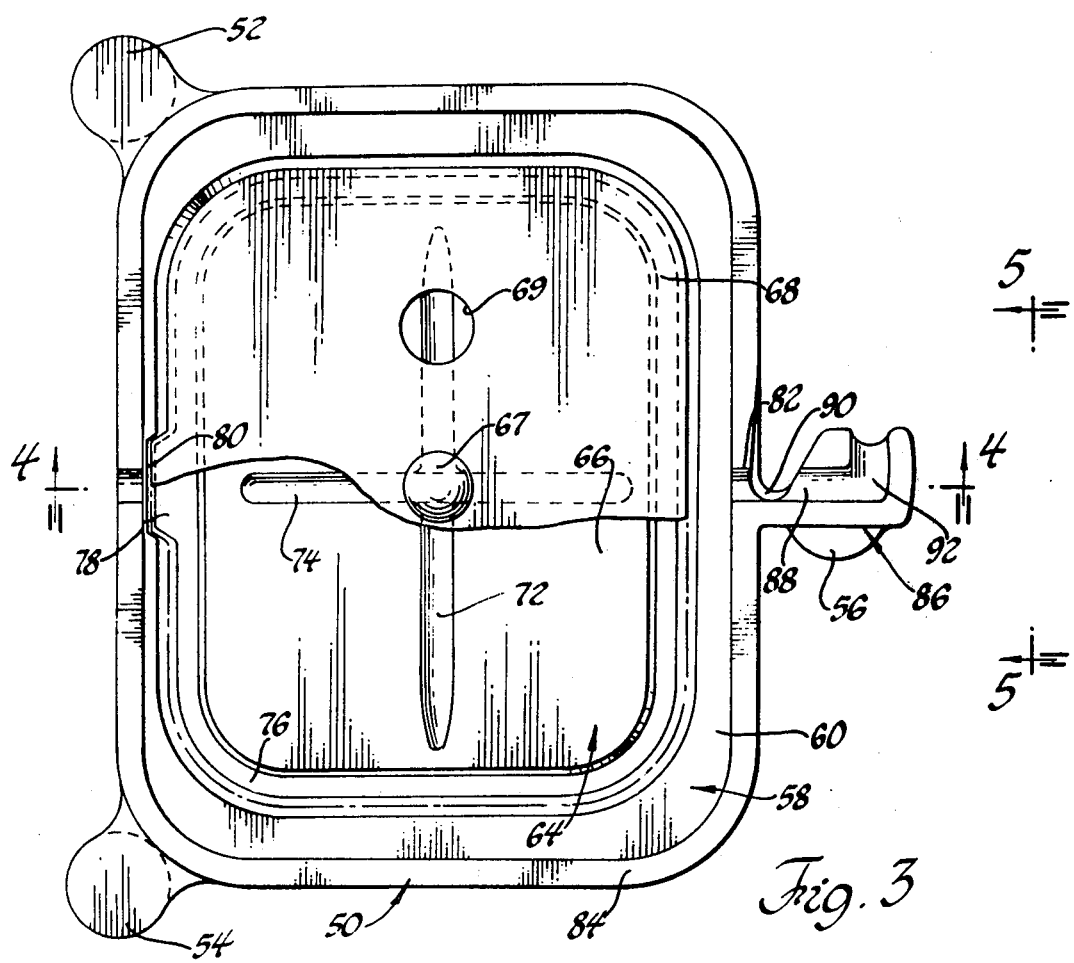
FIG. 3 is a plan view of molding apparatus for molding the flow control device shown in FIGS. 1 and 2.
Figure 4:
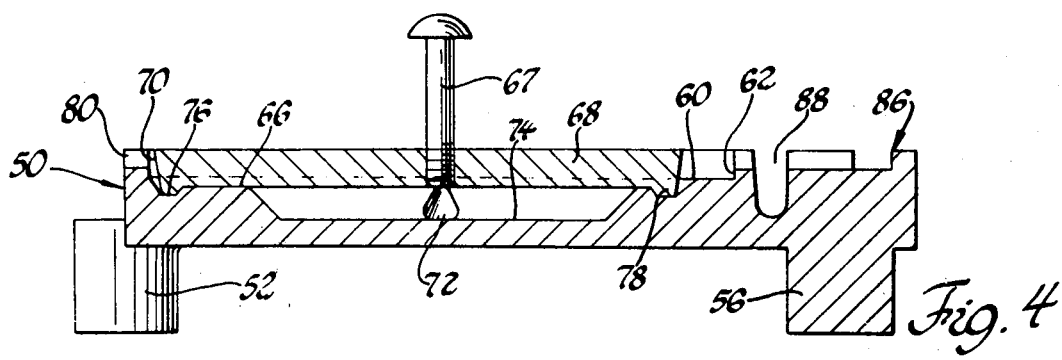
FIG. 4 is a sectional view taken on line 4—4 of FIG. 3.
Figure 5:
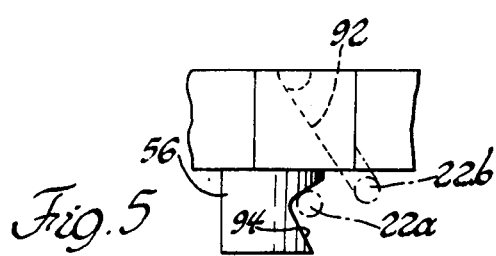
FIG. 5 is a view taken on line 5—5 of FIG. 3.

FIGS. 3, 4 and 5 illustrate molding apparatus for molding the control device 2. Reference numeral 50 collectively designates a mold body having legs 52, 54 and 56. A cavity is formed in the mold body 50 including a first mold portion 58 having a bottom surface 60 for defining one side surface of the sealing portion 6 of the control device 2 and an edge surface 62 for defining the outer periphery of the sealing portion 6. The mold cavity includes a second mold portion 64 surrounded by the first mold portion 58 and having a bottom surface 66 for defining one side surface of the main body portion 4 of the control device 2.

A removable mold member 68 is receivable in the second mold portion 64 and has an edge surface 70 for defining the inner periphery of the sealing portion 6. Transverse recesses 72 and 74 are formed in the bottom surface 66 of the second mold portion 64 for defining the beads 28 and 26, respectively, on the main body portion 4 of the control device 2. The mold portion 64 is also formed with a peripheral recess 76, and the mold member 68 has a corresponding flange 78 projecting from its lower side in FIG. 4 which is receivable in the recess 76.

The bottom surfaces of the first and second mold portions 58 and 64 are non-circular in plan, and the width of the bottom surface of the first mold portion 58 varies around the periphery of the second mold portion 64 in accordance with the configuration of the segments 34, 36, 38, 40 and 42 of the sealing portion 6 of the control device 2. The bottom surface 66 of the mold portion 64 projects outwardly as illustrated at 78 toward the edge surface of the mold portion 58 to define the locating projection of the control device 2.

Rod supporting means is formed on the mold apparatus of FIGS. 3, 4 and 5 and includes a pair of grooves 80 and 82 spaced from each other on opposite sides of the first and second mold portions, grooves 80 and 82 being formed in the rim 84 extending around the periphery of the mold body 50. The rod supporting means further includes a projection 86 extending outwardly from the rim 84 and having a rod receiving recess 88 formed therein which is in axial alignment with the grooves 80 and 82. The projection 86 includes a pair of crank arm locating slots 90 and 92 each communicating with the recess 82 for supporting the crank arm 22 of the mounting rod 8. The slot 90 is used to support a crank arm of one configuration, and the slot 92 is used to support a crank arm of a second configuration, as necessary. The slots 90 and 92 angularly locate the mounting rods with the mold cavity portions 58 and 64. As shown in FIG. 5, when the crank arm of the mounting rod is received in the slot 90, the crank arm comes to rest in a groove 94 formed in the support leg 56 to angularly locate the mounting rod. The mounting rod is indicated in phantom lines at 22a seated in the groove 94. When the slot 92 is used, the crank arm comes to rest in the slot in the location indicated approximately by the phantom lines 22b.

Threadedly mounted in the mold member 68 is a bolt 67 which serves as a handle for lifting the mold member 68 from its position seated in the groove 76 of the mold portion 64. Vent openings 69 are formed in the mold member 68 on opposite sides of the handle 67.

Figure 6:
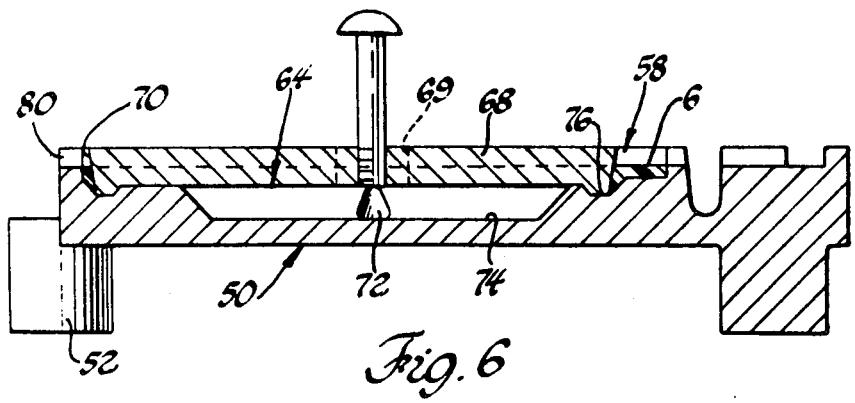
FIGS. 6, 7 and 8 are sectional views similar to FIG. 4 sequentially illustrating the steps in the manufacturing of the control device of FIGS. 1 and 2.
Figure 7:
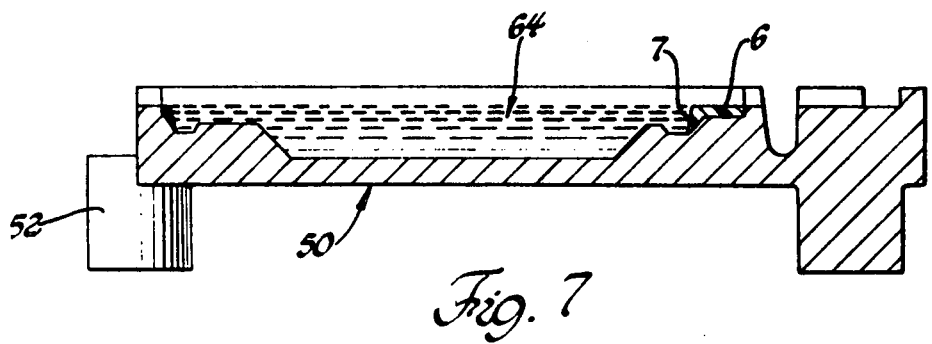
Figure 8:
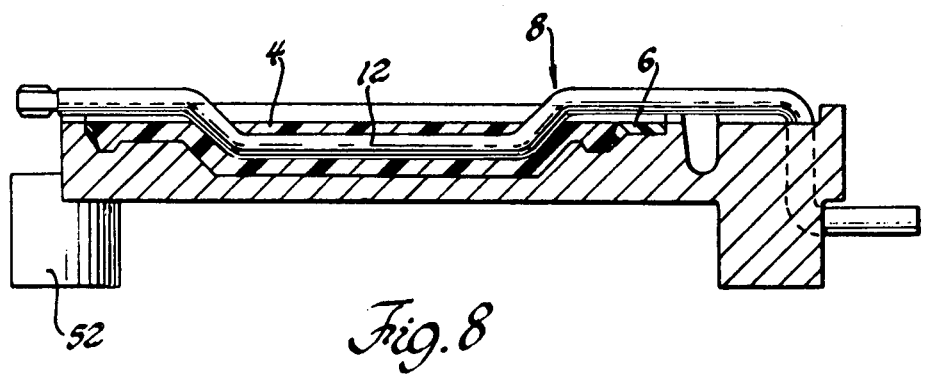

The manufacturing steps are illustrated in sequence in FIGS. 6, 7 and 8. In FIGS. 6, 7 and 8, the main body portion 4 is formed of thermosetting epoxy resin and the sealing portion 6 is formed of plastisol. By plastisol is meant a liquid dispersion of finely divided resin in a plasticizer. It is usually 100% solid with no volatiles, and when the volatile content exceeds 5% of the total weight, it is referred to as an organosol. When the plastisol is heated, the plasticizer solvates the resin particles, and the mass gels. With continued application of heat, the mass fuses to become a conventional thermoplastic material.

The removable mold member 6 is first heated to a temperature such that when plastisol comes into contact therewith, sufficient solvation will take place immediately to cause gelation of the plastisol in immediate contact therewith and thus prevent the liquid plastisol from leaking past the edge of the mold member 68. As illustrated in FIG. 6, with the heated mold member 68 mounted on the mold body 50 as shown, vinyl plastisol in liquid state is poured into the mold portion 58. When the liquid vinyl plastisol comes into contact with the hot mold member 68, the plastisol in immediate contact with the mold member 68 promptly gels to prevent leakage of the liquid plastisol around the mold member 68 into the mold portion 64.

The mold 50 along with the hot mold member 68 and the partially gelled liquid plastisol in the mold portion 58 is then further heated either in an oven or by infrared lights to partially cure the plastisol so that the vinyl plastisol becomes solid throughout in the configuration of the sealing portion 6. The removable mold member 68 is generally preheated to a temperature of about 250° which is a temperature substantially above the gelation temperature of the vinyl plastisol material.

After the vinyl plastisol material 6 of FIG. 6 is partially cured to a solid or non-liquid state, the mold member 68 is removed from the mold body 50. The second mold portion 64 is then filled with liquid epoxy resin as illustrated in FIG. 7. The elevated temperature of the mold body 50 resulting from the partial curing stage of the vinyl plastisol assists in causing the liquid epoxy resin to flow freely into contact with the inner periphery 7 of the partially cured sealing member 6.

The mounting rod 8 is then placed on the mold with the central portion 12 thereof immersed in the liquid epoxy resin. The entire assembly of the mold, mounting rod, partially cured sealing portion 6, and liquid epoxy resin is then placed in a curing oven or the like unitl the epoxy resin is solidified and the curing of the vinyl plastisol is completed. The curing temperature of the vinyl and of the epoxy resin is matched so that the curing time is equal for both the sealing portion and the main body portion 4. When curing is complete, the central portion 12 of the mounting rod 8 is embedded in the solidified epoxy resin, and the sealing portion 6 is bonded integrally to the periphery of the main body portion 4. Silicon is baked onto the mold to prevent the epoxy resin from bonding to the mold.

Examples of suitable vinyl plastisol compositions in parts by weight are:

EXAMPLE I

| | |
|---|---|
| Copolymer vinyl resin | 100.0 |
| Vinyl stabilizer | 1.0 |
| CaO | 1.0 |
| Solvating depressant | 4.0 |
| Polymeric plasticizers | 60.0 |
| Monomeric plasticizers | 250.0 |
| Color | 1.0 |

EXAMPLE II

| | |
|---|---|
| Resin | 100.0 |
| Stabilizer | 2.0 |
| Plasticizer | 50.0 |
| CaO | 1.0 |
| Plasticizer | 60.0 |
| Wetting agent | 4.0 |
| Softener | 10.0 |
| Blowing agent | 2.5 |

EXAMPLE III

| | |
|---|---|
| Copolymer vinyl resin | 100.0 |
| Vinyl stabilizer | 1.0 |
| CaO | 1.0 |
| Solvating depressant | 4.0 |
| Polymeric plasticizers | 15-30 |
| Monomeric plasticizers | 75-115 |
| Diluent plasticizers | 5-15 |
| Color | 1.0 |
| Blowing | 1.0 |

While specific embodiments of the invention have been disclosed in the accompanying drawings and described in the foregoing specification, it should be understood that the invention is not limited to the exact construction shown. Alterations in the construction and arrangement of parts, all falling within the scope and spirit of the invention, will be apparent to those skilled in the art.

I claim:

1. Open face molding apparatus for molding a flow control device having a main body portion of rigid plastic material and a sealing portion of elastomeric plastic material on the outer periphery of said main body portion with a pivot rod having a central portion and offset end portions with a crank arm formed on one end portion with the central portion only of the rod embedded in said main body portion, said molding apparatus comprising: a mold body having support means depending from the lower side thereof; an open mold cavity formed in the upper side of said mold body; said mold cavity including a first mold portion having a bottom surface for defining one side surface of said outer sealing portion and an edge portion for defining the outer periphery of said outer sealing portion; said mold cavity including a second mold portion surrounded at least partially by said first mold portion, said second mold portion having a bottom surface for defining one side surface of said main body portion of rigid plastic material; a rim projecting upwardly from the edge surface of said first mold portion; a pair of pivot rod supporting grooves in said rim spaced from each other on opposite sides of said mold cavity for supporting the offset end portions of the pivot rod above the edge of the first mold portion with the central portion of the pivot rod being received only in the second mold portion of said mold cavity; a projection extending outwardly from the periphery of said mold body; said projection having a rod receiving recess formed in the upper surface thereof in coaxial alignment with said pair of rod supporting grooves for receiving the end of the pivot rod having the crank arm supported thereon; at least one crank arm locating slot formed in said projection and communicating with said rod receiving recess, said crank arm locating slot projecting substantially radially from the common axis of said rod supporting grooves and rod receiving recess and at an angle with respect to the plane in which said common axis lies determined by the desired angular relationship between the crank arm and main body portion of the flow control device so that the pivot rod is located both axially and angularly with respect to the main body of the flow control device merely by placement in said rod supporting grooves, rod receiving recess and crank arm locating slot.

2. Apparatus as claimed in claim 1 including a plurality of crank arm locating slots formed in said projection and communicating with said rod receiving recess, said crank arm locating slots each projecting substantially radially from the common axis of said rod supporting grooves and rod receiving recess, said crank arm locating slots being spaced from each other along said common axis, said crank arm locating slots each projecting from said common axis at a different angle with respect to the plane in which said common axis lies for selectively axially and angularly locating pivot rods of different crank arm configurations on said mold body.

3. Apparatus as claimed in claim 1 including a recess formed in the bottom surface of said second mold portion in parallel relationship with the common axis of said rod supporting grooves and rod receiving recess for defining a stiffening bead projecting from the main body portion of the flow control device and providing extra thickness for the portion of said main body portion in which the central portion of the pivot rod is embedded.

4. Apparatus as claimed in claim 1 further including a removable mold member receivable in said second mold portion of said mold cavity, said removable mold member having an edge surface for defining the inner periphery of the outer elastomeric sealing portion of the flow control device, said second mold portion being formed with a peripheral recess and said removable mold member being formed with a depending peripheral flange receivable therein to locate said removable mold member.

* * * * *